United States Patent [19]

Mitschker et al.

[11] Patent Number: 4,988,738

[45] Date of Patent: Jan. 29, 1991

[54] PROCESS FOR THE PREPARATION OF BIFUNCTIONAL ANION EXCHANGE RESINS, NEW BIFUNCTIONAL ANION EXCHANGE RESINS AND USE THEREOF

[75] Inventors: Alfred Mitschker, Odenthal-Holz; Peter M. Lange, Leverkusen; Harold Heller, Cologne; Friedrich Werner, Roesrath-Forsbach; Hans-Karl Soest, Cologne; Günter Siegers, Bergisch Gladbach, all of Fed. Rep. of Germany

[73] Assignee: Bayer Aktiengesellschaft, Leverkusen, Fed. Rep. of Germany

[21] Appl. No.: 373,836

[22] Filed: Jun. 30, 1989

[30] Foreign Application Priority Data

Jul. 16, 1988 [DE] Fed. Rep. of Germany ....... 3824266

[51] Int. Cl.$^5$ .......................... C08F 8/30; C08F 12/08
[52] U.S. Cl. .................................... 521/30; 525/333.6
[58] Field of Search ........................ 521/30; 525/333.6

[56] References Cited

U.S. PATENT DOCUMENTS 4,177,140 12/1979 Smakman .............................. 521/32

FOREIGN PATENT DOCUMENTS 799620 8/1958 United Kingdom .

Primary Examiner—Joseph L. Schofer
Assistant Examiner—Tom Weber
Attorney, Agent, or Firm—Sprung Horn Kramer & Woods

[57] ABSTRACT

A process for the preparation of a bifunctional anion exchange resin by partial quaternization of a weakly basic anion exchanger containing tertiary amino groups which process comprises (a) partially loading the weakly basic anion exchanger with a strong acid and (b) quaternizing the partially loaded anion exchanger by means of a customary alkylating agent.

8 Claims, No Drawings

PROCESS FOR THE PREPARATION OF BIFUNCTIONAL ANION EXCHANGE RESINS, NEW BIFUNCTIONAL ANION EXCHANGE RESINS AND USE THEREOF

The invention relates to a new process for the preparation of bifunctional anion exchangers, the new bifunctional anion exchange resins obtainable by the process and use thereof.

In technical usage and in the context of the present invention, bifunctional anion exchange resins are those which contain weakly basic tertiary amino groups and strongly basic quaternary ammonium groups. Bifunctional anion exchange resins are known. Up to now, they are prepared by the following processes.

(a) reaction of resin matrices (of crosslinked polystyrene) containing chloromethyl groups with amine mixtures which contain tertiary and secondary amines in certain molar ratios (see, for example, U.S. Pat. No. 4,177,140);

(b) by partial quaternization of weakly basic anion exchangers containing tertiary amino groups (see U.S. Pat. Nos. 4,177,140, 3,001,868, EP-A 0,032,671).

Bifunctional anion exchangers, in particular weakly basic anion exchange resins having a low content of strongly basic groups and strongly basic anion exchange resins having a low content of weakly basic groups, are in addition formed as a result of secondary reactions in the preparation of weakly basic anion exchange resins by reaction of chloromethylated resin matrices with secondary amines or as a result of incomplete reaction in the preparation of strongly basic anion exchangers by quaternization of weakly basic anion exchangers containing tertiary amino groups.

The ratio of the strongly basic groups to the weakly basic groups in the bifunctional anion exchange resins is usually altered to suit the intended use of the anion exchangers and varies, depending on the use, between 3:97 and 90:10, preferably 4:96 and 80:20.

The bifunctional anion exchangers are distinguished, compared to the strongly basic anion exchangers, by an increased utilizable capacity (UC), a low tendency for contamination by organic substances, a low volume change on loading or regeneration and a low requirement for regenerating agents. Use is made of these properties in all sorts of areas, for example for demineralizing water, for the recovery of gold and silver from cyanide-containing aqueous solutions and in particular for desalting and decolorizing aqueous sugar solutions (see, for example, U.S. Pat. No. 4,177,140; GB-P 954,435; U.S. Pat. No. 4,082,701).

Compared to the weakly basic anion exchangers, the bifunctional anion exchangers have the advantage that they change their volume very much less on loading and regeneration and therefore require a smaller outlay in terms of apparatus and have a higher stability and longer life.

The bifunctional anion exchange resins known up to now are still not satisfactory, however, when used for the desalting and decolorizing of glucose solutions, since they cause a considerable part of the glucose to be isomerized to fructose as a result of their content of strongly basic groups. This isomerization is undesired as, for important areas of use, for example in the pharmaceutical area, pure glucose solutions, i.e. free from any impurities, that is even from fructose, are required. The object therefore existed of discovering bifunctional anion exchangers which have precisely the recognized good properties of the bifunctional anion exchange resins, such as high utilizable capacity, reversible binding of organic substances, low change in volume and less need for regenerating agents, but do not have their disadvantageous property of isomerizing glucose to fructose.

It has been found that bifunctional anion exchangers having the desired and/or even other new advantageous properties are obtained if the bifunctional anion exchangers are prepared in a certain manner, namely by partial quaternization of weakly basic anion exchangers containing tertiary amino groups, but partially loading them with strong acids before quaternization, i.e. converting before quaternization a certain part of weakly basic amino groups in the anion exchanger into the salt form.

The invention therefore relates to a process for the preparation of bifunctional anion exchange resin by partial quaternization of weakly basic anion exchangers containing tertiary amino groups by means of customary alkylating agents, which is characterized in that the weakly basic anion exchangers are partially loaded with strong acids before quaternization.

"Customary alkylating agents" in the context of the process according to the invention are to be understood as meaning the alkylating and aralkylating agents used in a known manner for the quaternization of weakly basic anion exchangers (see, for example, US-A 3,989,650 and 4,082,701).

The amount of strong acids used for the partial preloading, according to the invention, of the weakly basic anion exchange resins is preferably calculated so that 0.3 to 0.85 val of acid, preferably 0.35 to 0.80 val of acid, is allotted per mol of amino groups in the anion exchanger, i.e. that 30 to 85%, preferably 35 to 80%, of the amino groups of the anion exchanger are present in the salt form.

The partial loading, according to the invention, of the weakly basic anion exchangers with strong acids can be carried out in various ways:

1. by partially loading the weakly basic anion exchanger immediately with the calculated amount of acid; or 2. by carrying out the partial loading in two stages and first completely loading the weakly basic anion exchanger with an excess of acid and in a second stage partially regenerating the completely loaded weakly basic anion exchanger by treating with a calculated amount of aqueous base (0.7 to 0.15 val of base per mol of amino groups in the weakly basic anion exchanger).

The quaternization of the weakly basic anion exchangers which have been partially loaded according to procedure 1 results in bifunctional anion exchangers which havecompared with bifunctional anion exchangers having the same content of strongly basic groups, which have been prepared by known processes-a substantially reduced or no isomerization effect on glucose.

The quaternization of the weakly basic anion exchangers which have been partially loaded in two stages according to procedure 2 results in bifunctional anion exchangers which are distinguished from the bifunctional anion exchangers with the same degree of quaternization prepared by known methods by a greater decolorizing power, relatively easy regenerability and by a still smaller tendency for contamination by organic substances.

It has been found that by means of partial preloading of the weakly basic anion exchangers with strong acids, a certain arrangement of the strongly and weakly basic groups within the resin particle is obtained and that this certain arrangement of the strongly basic groups in the resin particle is the reason for the new, improved properties of the bifunctional anion exchangers obtainable according to the invention.

The quaternization of the weakly basic anion exchangers which have been partially loaded according to procedure 1 results in bifunctional anion exchangers which contain the strongly basic groups in the middle of the resin particle; in the quaternization of the weakly basic anion exchangers which have been partially loaded according to procedure 2, the strongly basic groups are found in the shell of the resin particle. The quaternization of the weakly basic anion exchangers without acid pretreatment results in bifunctional anion exchangers in which the strongly basic groups are distributed randomly over the entire particle cross-section.

In order to achieve an as uniform as possible partial loading of the resin particles, the partial loading of the weakly basic anion exchangers with acids according to procedure 1 is preferably carried out in such a way that the weakly basic anion exchangers are suspended in the calculated amount of aqueous acid and the suspension is stirred intensively at temperatures from 5° to 40° C., preferably at room temperature, until the pH of the aqueous solution no longer changes. The partial loading of the weakly basic anion exchanger with acid can also be carried out, however, in a manner in which the exchanger is suspended in completely demineralized water and the calculated amount of acid is added to the suspension with intensive stirring at temperatures from 5° to 40° C. and the suspension is then again stirred until the pH is constant. The partial quaternization to give the bifunctional anion exchanger can then be carried out immediately by addition of the alkylating agent to the suspension.

In the partial loading of the weakly basic anion exchangers according to procedure 2, the first part stage, the complete loading of the weakly basic anion exchanger with acids, can be carried out both by suspending the weakly basic anion exchanger in the acid and stirring the suspension until the pH of the aqueous solution is constant (batch method) or by passing the acid over the anion exchanger in a filter column (column method). After complete loading, the excess of acid is removed by washing with demineralized water. In order to achieve an as uniform as possible partial regeneration of all resin particles, the second part stage, the partial regeneration, is preferably carried out by the batch method, i.e. the weakly basic anion exchanger in the salt form is suspended in demineralized water and the calculated amount of base is added to the suspension with intensive stirring at temperatures from 5° to 40° C., and the suspension is then stirred until the pH of the aqueous solution is constant.

Suitable acids for the loading of the weakly basic anion exchangers with acids are strong inorganic acids such as hydrochloric acid, nitric acid, sulphuric acid and phosphoric acid and strong organic acids such as formic acid and p-toluenesulphonic acid. The inorganic acids are preferred for economic reasons.

The concentrations of the acids in the aqueous solutions used for loading are preferably 0.1 to 20% by weight, in particular 5 to 10% by weight.

For the partial regeneration of the completely loaded weakly basic anion exchangers, both inorganic and organic bases can be used as aqueous solutions; aqueous solutions of sodium hydroxide, potassium hydroxide, sodium carbonate and ammonia are preferably employed. The concentrations of the bases in the aqueous solutions are preferably 5–10% by weight.

The weakly basic anion exchange resins to be used for the preparation of the bifunctional anion exchangers in the process according to the invention and their preparation are known (see, for example, Ullmann's Enzyklopädie der technischen Chemie (Ullmann's Encyclopaedia of Industrial Chemistry), 4th edition, Volume 13, pages 301–303). Weakly basic anion exchange resins based on crosslinked polyacrylates or crosslinked polystyrenes can be used. The anion exchangers can be gel-like or macroporous. Bifunctional anion exchangers having particularly advantageous properties are obtained starting from resins of crosslinked polystyrene.

Following to the partial loading according to the invention of the weakly basic anion exchangers with strong acids, the anion exchangers present partially in the salt form are quaternized in a customary manner (see Ullmann's Encylopaedia loc. cit.). The degree of quaternization depends on the use for which the anion exchanger concerned is intended. For desalting sugar solutions, bifunctional anion exchangers based on crosslinked polystyrene are preferably used, the content of strongly basic groups of which is 5 to 25% of the total basic groups contained in the anion exchanger; for decolorizing sugar solutions, bifunctional, quaternized anion exchangers based on crosslinked polyacrylate containing hydrophobic radicals, for example benzyl radicals are preferably used, the content of strongly basic groups of which is 20 to 75, preferably 40 to 60, % of the total groups contained in the anion exchanger.

EXAMPLE 1

280 ml (0.515 mol) of a macroporous weakly basic anion exchanger based on polystyrene crosslinked with 8% by weight of divinylbenzene (total capacity=content of dimethylaminomethyl groups: 1.842 mol/l) are stirred with 361 ml of 1N HCl (0.361 val) in a four-necked flask fitted with a pressure-retaining valve, gas inlet tube, stirrer and thermometer until the pH of the aqueous solution no longer changes (about 30 min.). 4.1 g (0.081 mol) of methyl chloride are then introduced at 40° C. under pressure and while stirring. The reaction mixture is stirred for 7 hours at this temperature in order to complete the reaction.

After cooling, the liquid phase is separated off and the bead polymer is first regenerated in a filter column with 4% strength sodium hydroxide solution, and the quaternary ammonium groups contained in the resin are converted into the chloride form by passing sodium chloride solution over.

297 ml of bifunctional anion exchanger are obtained.

Content of strongly basic groups: 0.08 mol (=0.27 mol/l);

Content of weakly basic groups: 0.448 mol (=1.51 mol/l).

EXAMPLE 2

270 ml of the weakly basic anion exchanger described in Example 1 (corresponding to 0.497 mol of amino groups) are converted into the chloride form by passing 4N hydrochloric acid over in a filter column. The excess of acid is removed by washing the anion exchanger with demineralized water (pH of the draining washing water: 4–5). The 385 ml of anion exchanger in the salt form obtained in this manner are suspended in 300 ml of demineralized water in the apparatus described in Example 1. 199 ml of 1N sodium hydroxide solution (0.199 mol) are then added while stirring and the suspension is stirred until the pH of the aqueous solution is constant (about 30 min.). The resin is then partially quaternized by the procedure described in Example 1 using 4.1 g (0.081 mol) of methyl chloride. After formulation as also described in Example 1 (regeneration with 4% strength sodium hydroxide solution and conversion of the quaternary ammonium groups into the chloride form), 315 ml of bifunctional anion exchanger are obtained.

Content of strongly basic groups: 0.082 mol (=0.26 mol/l)

Content of weakly basic groups: 0.425 mol (=1.35 mol/l).

EXAMPLE 3

1,000 ml of the weakly basic anion exchanger described in Example 1 (corresponding to 1.824 mol of amino groups) are first partially loaded by stirring with 912 ml of 1N HCl (0.912 val) by the procedure described in Example 1 and then partially quaternized with 0.25 mol of methyl chloride.

After formulation, 1,140 ml of bifunctional anion exchanger are obtained.

Content of strongly basic groups: 0.24 mol (=0.21 mol/l)

Content of weakly basic groups: 1.58 mol (=1.39 mol/l).

EXAMPLE 4

1,190 ml of a macroporous weakly basic anion exchanger based on polystyrene crosslinked with 8% by weight of divinylbenzene (content of dimethylaminomethyl groups: 1.802 mol/l) are first partially loaded by stirring with 1,500 ml of 1 N hydrochloric acid by the procedure described in Example 1 and then partially quaternized by reaction with 6.55 g (0.13 mol) of methyl chloride. After formulation as also described in Example 1, 1,240 ml of bifunctional anion exchanger are obtained.

Content of strongly basic groups: 0.124 mol (=0.1 mol/l)

Content of weakly basic groups: 1.674 mol (=1.35 mol/l).

When using this bifunctional anion exchanger for the purification of glucose solutions, the decrease of the rotation value of the glucose solution after treatment with this anion exchanger is within the accuracy of measurement, i.e. during treatment of the glucose solution with this anion exchanger, virtually no isomerization of glucose to fructose takes place.

EXAMPLE 5

1,000 ml of a macroporous weakly basic anion exchanger based on poly-[N-(3-dimethylamino-propyl)-acrylamide] crosslinked with 5% by weight of divinylbenzene and 2% by weight of octa-1,7-diene (content of basic groups: 1.8 mol) are suspended in 1,000 ml of demineralized water in the apparatus described in Example 1. The suspension is cooled to 5° C. while stirring and then 69 g of 96% strength sulphuric acid (1.36 val) are added in the course of 40 min. while stirring at 5° to 10° C. The suspension is stirred at 10° C. until the pH is constant (about 30 min.). The degree of loading of the anion exchanger pretreated in this way is about 75 mol %.

11.9 g (0.235 mol) of methyl chloride are then introduced into the suspension in the course of 2 hours while stirring at 10° to 15° C. The reaction mixture is stirred for a further 2 hours.

The partially methylated anion exchanger is formulated in a filter tube by passing 4% strength sodium hydroxide solution and sodium chloride solution over, as indicated in Example 1.

1,050 ml of bifunctional anion exchanger are obtained.

Content of strongly basic groups: 0.10 mol/l

Content of weakly basic groups: 1.56 mol/l.

EXAMPLE 6

1,000 ml of the strongly basic anion exchanger based on polyacrylamide described in Example 5 are completely loaded in a filter tube by passing 2.5 l of 10% strength sulphuric acid over. The excess of acid is removed by washing with demineralized water until the pH in the drainings is increased above 3.

The anion exchange resin completely converted into the salt form in this way is suspended in 1,000 ml of demineralized water in the apparatus described in Example 1. The suspension is cooled to 5° C. and then 40 g of 45% strength sodium hydroxide solution (0.45 val) are added while stirring at 3° to 5° C. in the course of 10 min. In order to complete the neutralization, the suspension is stirred for a further 30 min. at a constant pH of 9.3. The degree of loading of the anion exchanger after this partial regeneration is about 75 mol %.

The partial methylation of the anion exchanger with 11.9 g of methyl chloride and the formulation of the bifunctional anion exchanger are carried out as described in Example 5.

1,060 ml of bifunctional anion exchanger are obtained.

Content of strongly basic groups: 0.095 mol/l

Content of weakly basic groups: 1.56 mol/l.

EXAMPLE 7

1,000 ml of the weakly basic anion exchanger based on polyacrylamide described in Example 5 are completely converted into the salt form, as indicated in Example 6, by first using 2.5 l of 10% strength sulphuric acid.

The anion exchange resin pretreated in this way is then transferred to a stirring flask, fitted with a stirrer, thermometer, dropping funnel, reflux condenser and pH measuring device, and, after addition of 800 ml of demineralized water, 80 g (0.9 mol) of 45% strength sodium hydroxide solution are added while stirring at 5°–10° C. in the course of 10 minutes. The mixture is subsequently stirred for 30 minutes at a constant pH (9.5), then 114 g of benzyl chloride (0.9 mol) are added and the mixture is stirred for a further 8 hours at 50° C. During this time the pH is kept constant at 9.5 by adding dropwise a total of 180 ml of 5 M NaOH to the suspension.

After cooling, the partially benzylated anion exchanger is first washed in a filter tube with methanol in order to remove residual benzyl chloride, and then with demineralized water to displace the methanol.

1,150 ml of bifunctional anion exchanger are obtained.

Content of strongly basic groups: 0.53 mol/l

Content of weakly basic groups: 0.75 mol/l.

If 145 g of p-chloro-benzyl chloride are employed instead of 114 g of benzyl chloride, 1,130 ml of bifunctional anion exchange resin having a content of 0.45 mol/l of strongly basic groups and 0.85 mol/l of weakly basic groups are obtained.

What is claimed is:

1. A process for the preparation of a bifunctional anion exchange resin by partial quaternization of a weakly basic anion exchanger containing tertiary amino groups which process comprises (a) partially loading the weakly basic anion exchanger with a strong acid and then (b) quaternizing the partially loaded anion exchanger by means of a customary alkylating agent.

2. The process of claim 1, wherein 30 to 85% of the amino groups in the anion exchanger are loaded with a strong acid.

3. The process of claim 1, wherein a mineral acid is used in step (a) for the partial loading.

4. The process of claim 1, wherein the partial loading in step (a) is carried out with a calculated amount of an acid.

5. The process of claim 1, wherein the partial loading in step (a) is carried out in two stages, by first completely loading the weakly basic anion exchanger with excess acid and in a second stage partially regenerating the completely loaded weakly basic anion exchanger by treating with a calculated amount of aqueous base.

6. The process of to claim 1, wherein the weakly basic anion exchange resin containing tertiary amino groups is a resin based on crosslinked polystyrene.

7. A bifunctional anion exchanger containing weakly and strongly basic groups which is obtained by (a) partial loading of the tertiary groups of a weakly basic anion exchanger with strong acids and (b) subsequent partial quaternization of the weakly basic anion exchanger partially present in the salt form by means of a customary alkylating agent.

8. A bifunctional anion exchanger containing weakly and strongly basic groups which is obtained by partial loading of the tertiary amino groups of a weakly basic anion exchanger based on crosslinked polystyrene with such an amount of acid that 30 to 85% of the tertiary amino groups are present in the salt form, and subsequent quaternization with such an amount of alkylating agent that the content of strongly basic groups in the bifunctional anion exchanger is 5 to 25% of the total basic groups contained in the resin.

* * * * *